(12) United States Patent
Sato (10) Patent No.: US 7,529,038 B2
(45) Date of Patent: May 5, 2009

(54) OPTICAL APPARATUS

(75) Inventor: Tatsuya Sato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/846,422

(22) Filed: Aug. 28, 2007

(65) Prior Publication Data

US 2008/0055743 A1 Mar. 6, 2008

(30) Foreign Application Priority Data

Aug. 31, 2006 (JP) .............................. 2006-236438

(51) Int. Cl.
  *G02B 15/14* (2006.01)
  *G02B 7/02* (2006.01)
  *G03B 5/02* (2006.01)
(52) U.S. Cl. ...................... 359/696; 359/694; 359/699; 359/700; 359/823; 396/349
(58) Field of Classification Search ......... 359/694–706, 359/822–826, 642; 396/448, 79, 89, 439, 396/349, 72, 87, 133, 144, 146, 529; 348/345, 348/375, 207.99, E5.028, E5.042, E5.043, 348/E5.045; 369/44.23, 44.29
See application file for complete search history.

(56) References Cited

U.S. PATENT DOCUMENTS

| 5,392,159 | A | * | 2/1995 | Sasaki et al. ................ 359/691 |
| 5,486,888 | A | * | 1/1996 | Shiina et al. ................ 396/349 |
| 5,592,335 | A | * | 1/1997 | Omi et al. ................... 359/695 |
| 6,594,205 | B1 | * | 7/2003 | Aarts et al. ............... 369/44.23 |
| 2005/0254145 | A1 | * | 11/2005 | Tsuzuki ...................... 359/701 |

FOREIGN PATENT DOCUMENTS

| JP | 5-011310 | 1/1993 |
| JP | 2002-350706 | 4/2002 |
| JP | 2002-189166 | 7/2002 |

* cited by examiner

*Primary Examiner*—Loha Ben
(74) *Attorney, Agent, or Firm*—Canon U.S.A. Inc IP Div (57) ABSTRACT

An optical apparatus is capable of achieving reduction in noise caused by lens driving and reduction in size. The optical apparatus includes a main and a movable housing member which houses a lens movable in a direction of an optical axis. The housing member is movable in the optical axis direction between a first position where the movable housing member is retracted in the main body and a second position where the movable housing member protrudes from the first position. Further, the apparatus includes a first actuator which moves the movable housing member between the first position and the second position, and a second actuator which moves the lens with respect to the movable housing member.

4 Claims, 9 Drawing Sheets

OPTICAL APPARATUS

BACKGROUND OF THE INVENTION

1. Field of the Invention

The present invention relates to an optical apparatus such as an image-pickup apparatus having a so-called retractable type lens barrel and a lens apparatus which is attached to the image-pickup apparatus.

2. Description of the Related Art

An image-pickup apparatus such as a compact digital still camera is often equipped with a retractable type lens barrel, which is retracted in the main body of the image-pickup apparatus when the apparatus is not in use (in a power-off state).

In a conventional retractable type lens barrel, a cam ring is rotated about an optical axis by a single motor, thereby moving a movable barrel, which engages with a cam-groove portion formed in the cam ring, and a lens thereinside between a retracted position and a zoom range extending from the wide-angle end to the telephoto end (see e.g., Japanese Patent Laid-Open No. 2002-350706).

However, a configuration in which a cam ring drives both a movable barrel and a lens is unsuitable for reducing noise caused by lens driving (zooming). More specifically, an output from a motor is transmitted to the cam ring through a reduction gear train, and the load in driving the movable barrel and lens increases noise generated from the reduction gear train. Also, when the cam ring is rotated, sliding of the cam ring on a fixed barrel, which rotatably supports the cam ring on the inner circumference or outer circumference side of the cam ring, generates a sliding sound. The sliding sound also interferes with noise reduction.

Like video cameras, a digital still camera of recent years is equipped with a moving-image-pickup function. For this reason, suppression of noise generated in zooming during image pickup (image capturing) is becoming important also in a digital still camera including a retractable type lens barrel.

Further, when a plurality of lenses that are driven in an optical axis direction inside a movable barrel during zooming and they are driven by a cam ring that drives the movable barrel, the number of cam-groove portions provided in the optical axis direction needs to be increased, thus increasing the length of the cam ring in the optical axis direction. This leads to an increase in the size of the image-pickup apparatus.

BRIEF SUMMARY OF THE INVENTION

The present invention is directed to an optical apparatus capable of achieving reduction in noise caused by lens driving and reduction in size.

According to one aspect of the present invention, an optical apparatus includes a main body and a movable housing member which houses a lens movable in a direction of an optical axis. The housing member is movable in the optical axis direction between a first position where the movable housing member is retracted in the main body and a second position where the movable housing member protrudes from the first position. Also, the apparatus includes a first actuator which moves the movable housing member between the first position and the second position, and a second actuator which moves the lens with respect to the movable housing member.

Further objects and features of the present invention will be apparent from the embodiments described with reference to the accompanying drawings.

DETAILED DESCRIPTION OF THE EMBODIMENTS

Embodiments of the present invention will be described below with reference to the drawings.

FIGS. 1 to 9 show the configuration of a lens barrel of a digital still camera as an image-pickup apparatus (optical apparatus) in accordance with an embodiment of the present invention. Note that the lens barrel alone also constitutes an optical apparatus.

Figure 1:
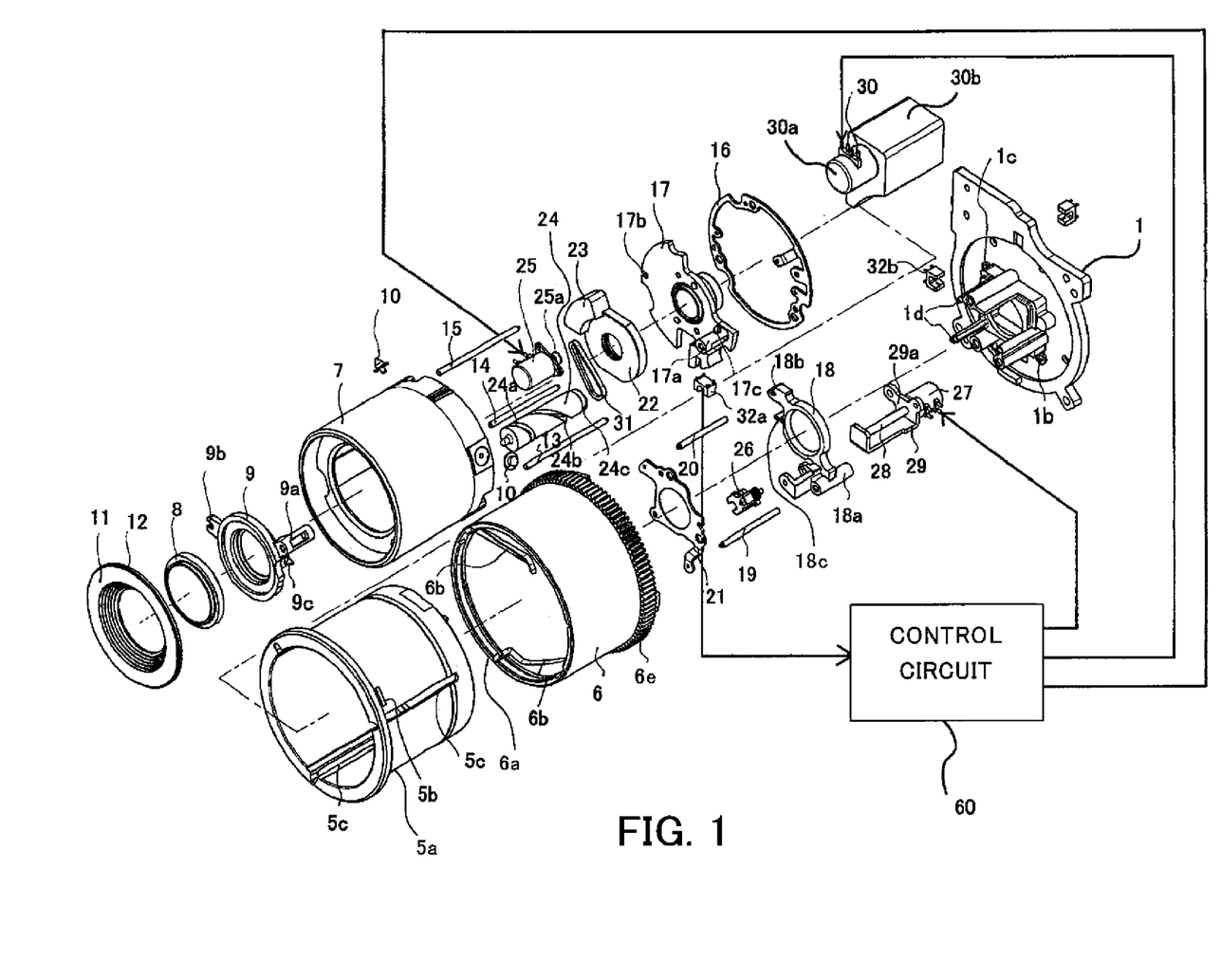
FIG. 1 is an exploded perspective view showing the configuration of a lens barrel of a camera in accordance with an embodiment of the present invention.
Figure 2:
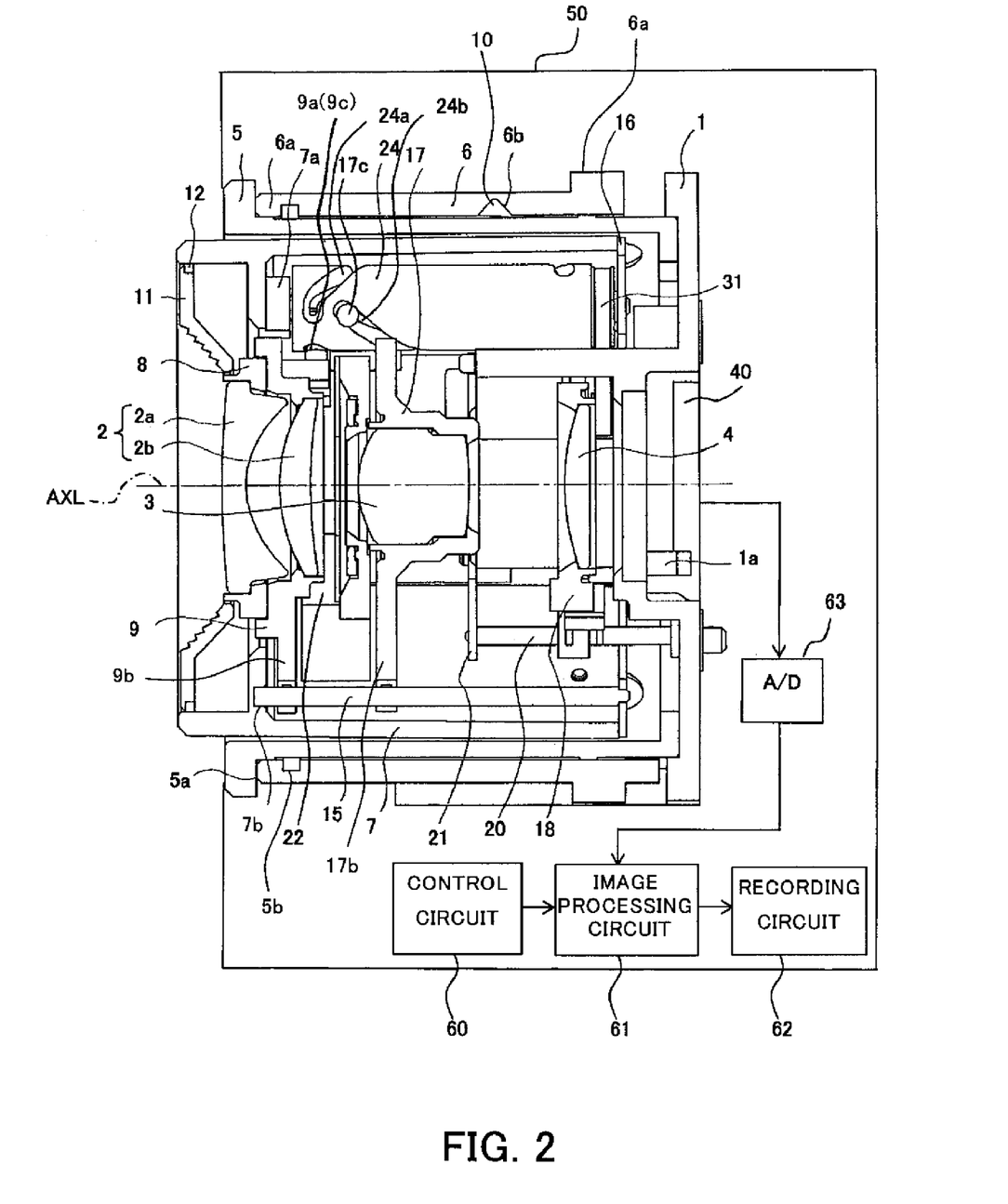
FIG. 2 is a sectional view showing a retracted state of the lens barrel of the embodiment.

FIG. 1 is an exploded view of the lens barrel, and FIG. 2 shows a retracted state of the lens barrel. Each of FIGS. 1 and 2 also shows part of an electric circuit of the digital still camera. In FIG. 2, reference numeral 50 denotes a main body of the digital still camera (main body of the image-pickup apparatus; hereinafter referred to as a camera main body).

Figure 3:
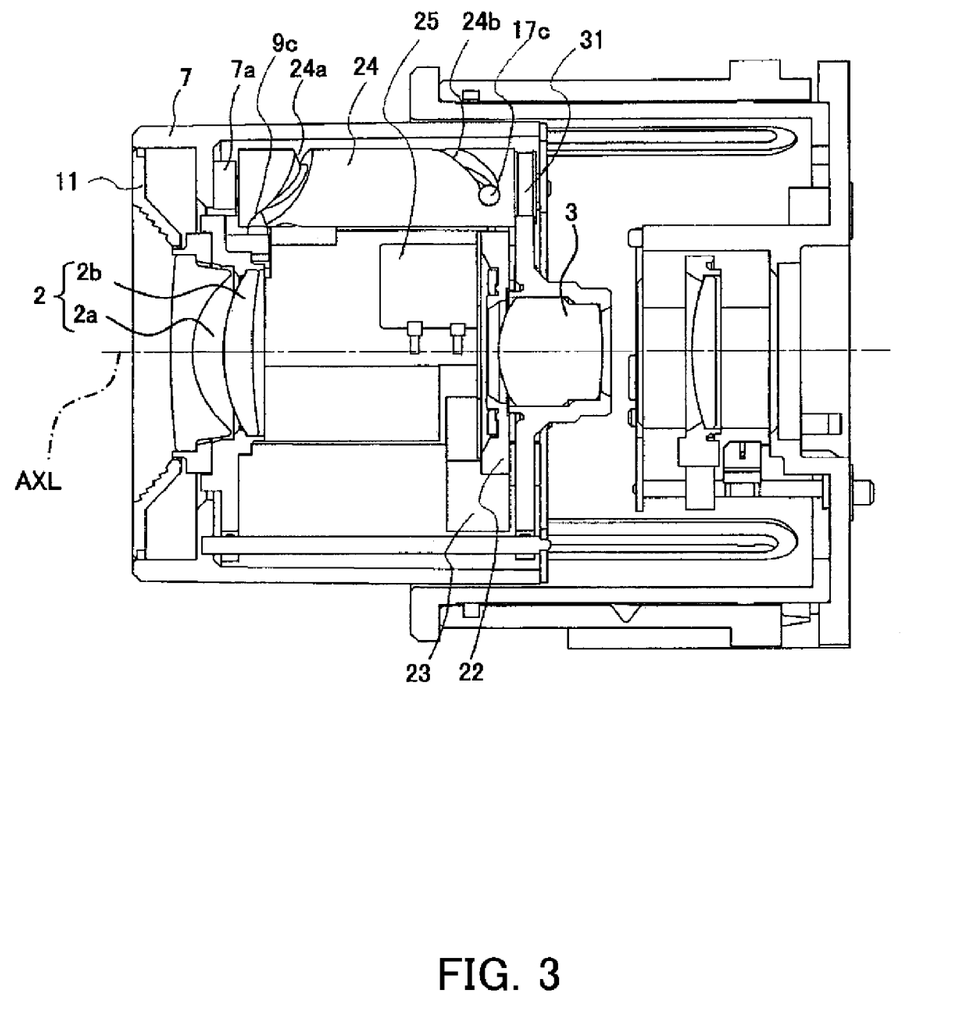
FIG. 3 is a sectional view showing a wide-angle state of the lens barrel of the embodiment.
Figure 4:
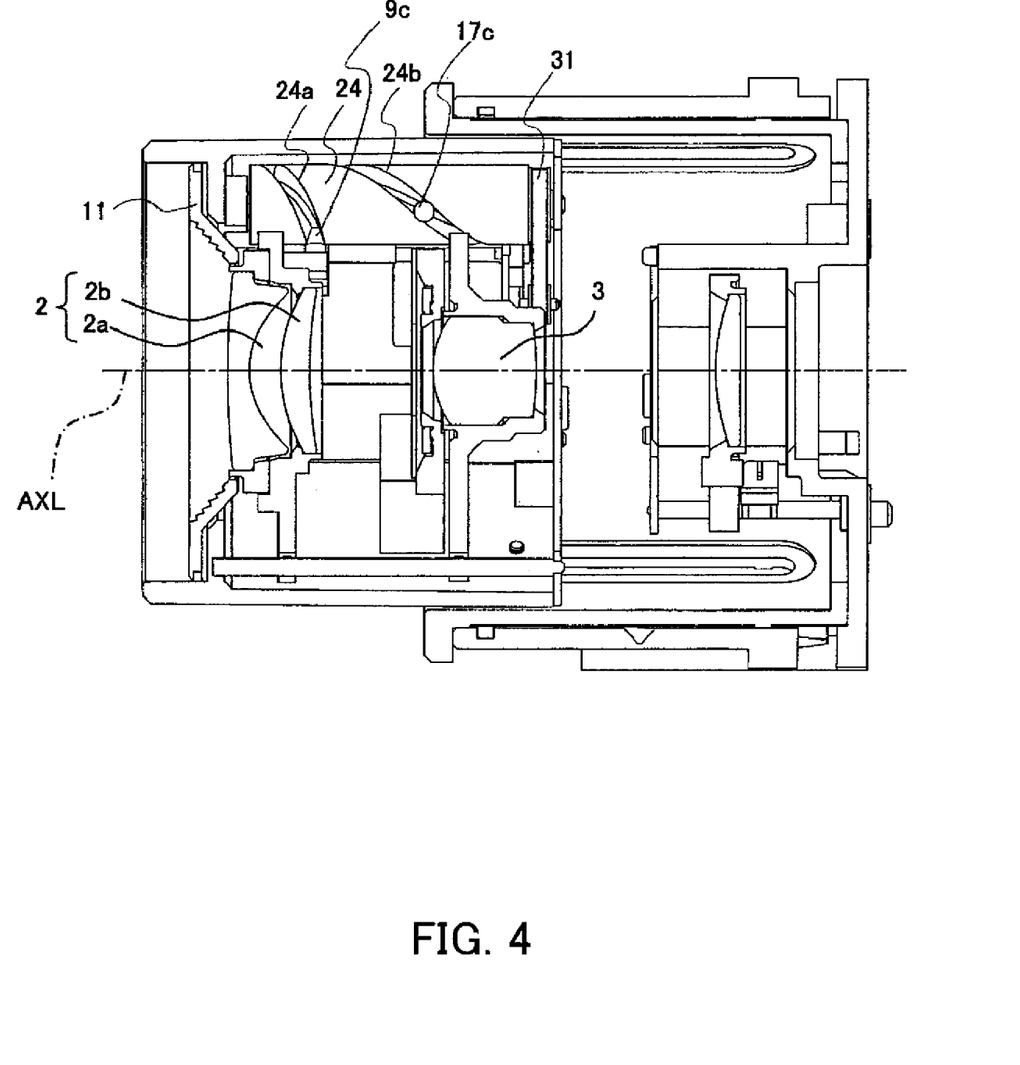
FIG. 4 is a sectional view showing an intermediate-focal-length state of the lens barrel of the embodiment.
Figure 5:
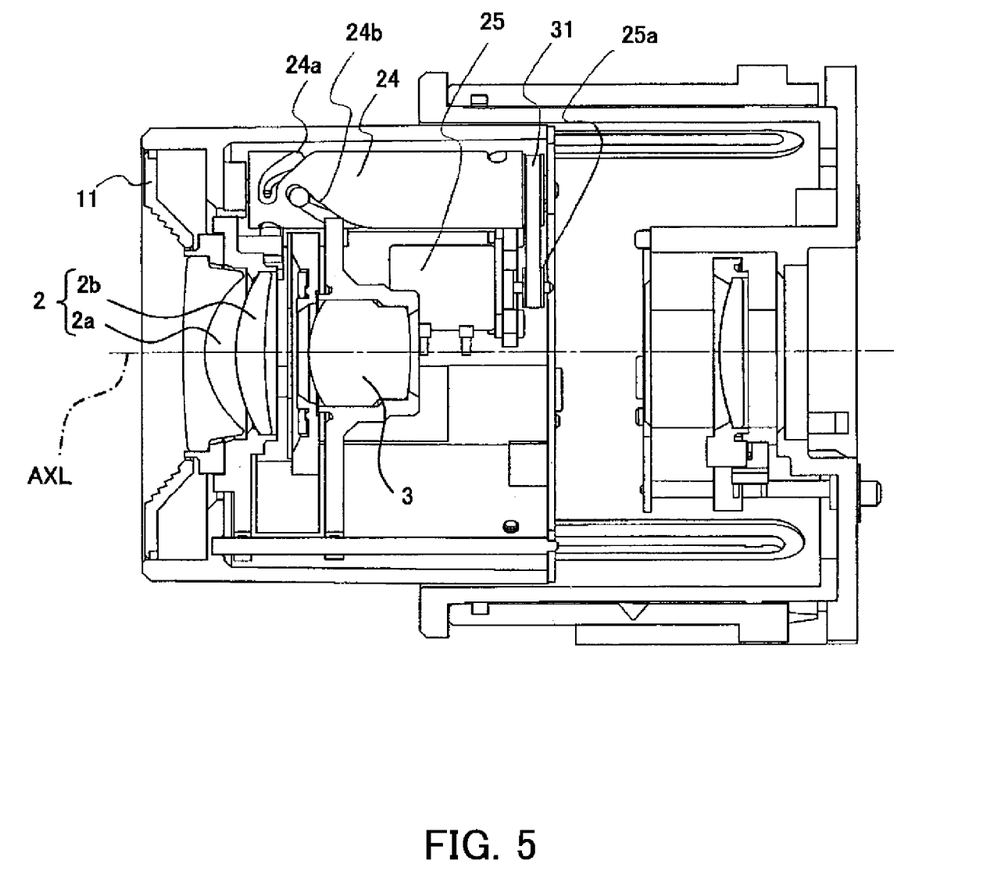
FIG. 5 is a sectional view showing a telephoto state of the lens barrel of the embodiment.
Figure 6:
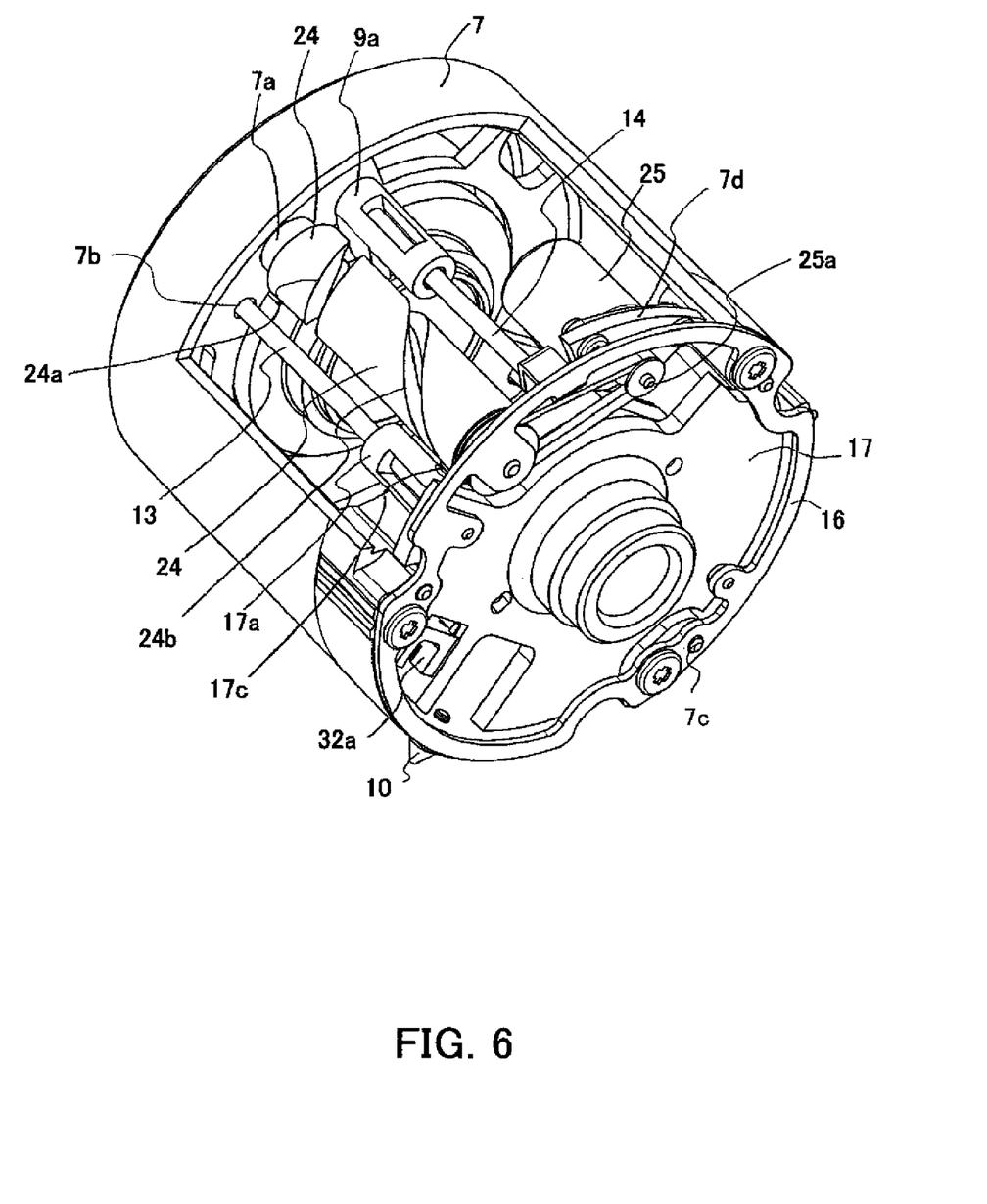
FIG. 6 is a perspective view showing the configuration of a movable barrel unit in the lens barrel of the embodiment.
Figure 7:
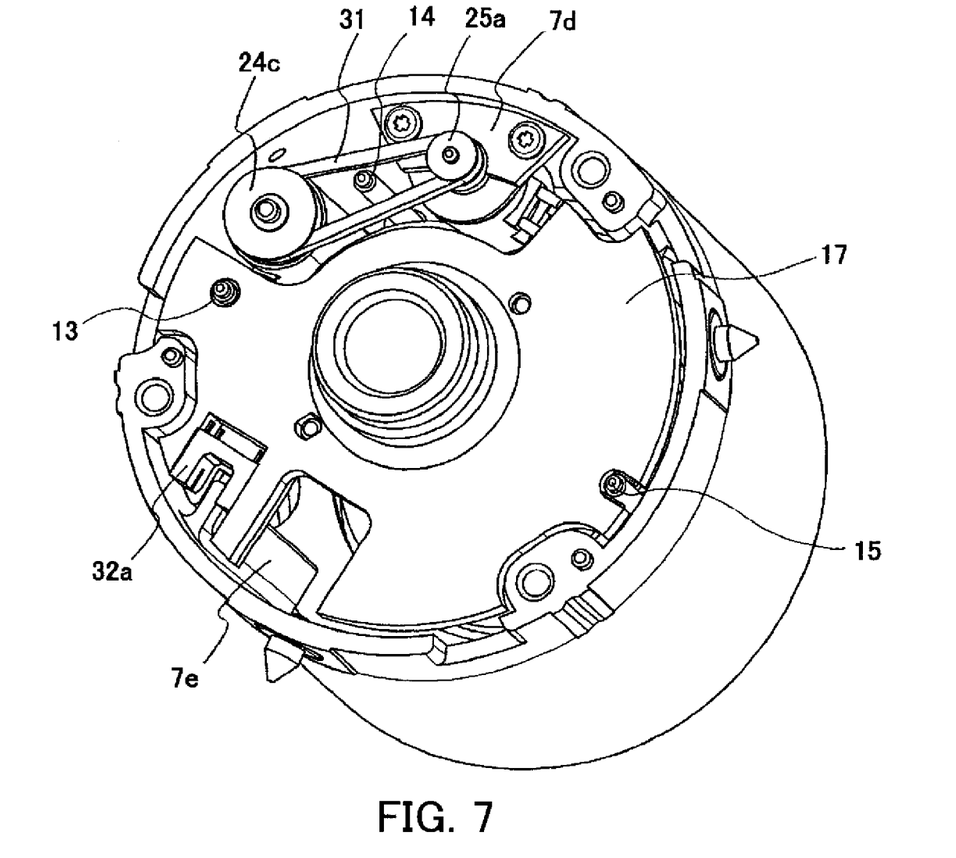
FIG. 7 is a perspective view showing the configuration of the movable barrel unit in the lens barrel of the embodiment.

FIG. 3 shows a wide-angle (wide-angle end) state of the lens barrel, FIG. 4 shows an intermediate-focal-length state, and FIG. 5 shows a telephoto (telephoto-end) state. FIGS. 6 and 7 are perspective views of a movable barrel unit, wherein a peripheral wall of a movable barrel, described later, is partially cut away and some parts of the unit are not shown.

In these figures, reference numeral 1 denotes an image sensor holder, which supports the entire lens barrel and has an image sensor attaching portion 1a. As shown in FIG. 2, an image-pickup element (image sensor) 40 such as a CCD sensor or CMOS sensor is attached to the image sensor attaching portion 1a. A signal output from the image-pickup element 40 is converted into a digital signal by an A/D converter 63 and then input to an image processing circuit 61. The image processing circuit 61 generates an image signal from the input digital signal. The image signal is sent to a recording circuit 62 to be recorded on a recording medium such as a semiconductor memory. The image signal is also displayed as an image on a display device (not shown) such as an LCD.

Reference numeral 2 denotes a first movable lens, which is constituted by a first lens element 2a and a second lens element 2b. The first movable lens 2 is a lens arranged closest to an object among a plurality of lenses including other lenses, described later. Reference numeral 3 denotes a second movable lens, and reference numeral 4 denotes a third movable lens.

Reference numeral 5 denotes a guide barrel as a fixed barrel (lens-barrel main body) fixed to the image sensor holder 1. The image sensor holder 1 and the guide barrel 5 are fixed inside the camera main body 50. The movable barrel, described later, advances or retreats in an optical axis direction between a retracted position (a position where the movable barrel is retracted in the camera main body 50) shown in FIG. 2 and a wide-angle position as an image-capturable position (protruding position, or a position where the movable barrel protrudes from the retracted position) shown in FIG. 3 with respect to the guide barrel 5 (i.e., the camera main body 50).

Reference numeral 6 denotes a cam ring which is rotatably attached to the outer circumference of the guide barrel 5. A rib portion 6a formed to extend in a circumferential direction at the inner circumference of the cam ring 6 is bayonet-coupled between a contacting portion 5a, which is provided at the front-end (object side end) of the guide barrel 5, and a protruding portion 5b, which is provided behind the contacting portion 5a, thereby preventing the cam ring 6 from moving in the optical axis direction with respect to the guide barrel 5.

Reference numeral 30 denotes a stepping motor unit. The stepping motor unit 30 is constituted by a stepping motor 30a as a first actuator and a reduction gear mechanism (reduction gear train) 30b, which reduces the speed of an output from the stepping motor 30a and transmits the output to a large gear portion 6e of the cam ring 6. The stepping motor unit 30 is fixed to the image sensor holder 1. The stepping motor 30a is activated in response to a driving signal transmitted from a control circuit 60 shown in FIGS. 1 and 2 through a flexible printed board (not shown). The control circuit 60 governs the control of the entire camera operations and controls the operations of the image processing circuit 61 and recording circuit 62 described above.

Reference numeral 8 denotes a front lens frame which holds the first lens element 2a, and reference numeral 9 denotes a first movable lens frame that holds the front lens frame 8 and the second lens element 2b. Optically necessary positioning of the front lens frame 8 with respect to the first movable lens frame 9 is performed in the lens barrel in its assembly-completion state. More specifically, the front lens frame 8 is held so as to be capable of being decentered with respect to the first movable lens frame 9 in a direction orthogonal to an optical axis AXL (see FIGS. 2 to 5). The decentering adjustment can be performed such that the lens barrel is brought into good optical condition. After the adjustment, the front lens frame 8 and first movable lens frame 9 are bonded together with adhesives or the like.

Reference numeral 7 denotes a movable barrel as a movable housing member. Inside the movable barrel 7, the first movable lens 2 and the second movable lens 3 are housed so as to be movable in the optical axis direction. Taper rollers (cam followers) 10 are fixed on the outer circumference of the movable barrel 7. The taper rollers 10 engage with guide groove portions 5c, which are formed in the guide barrel 5 so as to extend in the optical axis direction and engage with cam-groove portions 6b that are formed in the inner circumference of the cam ring 6.

Reference numeral 11 denotes a garnish ring which is fixed to the front lens frame 8. The garnish ring 11 blocks external light from coming through spaces between the front lens frame 8, the first movable lens frame 9, and the movable barrel 7. Reference numeral 12 denotes a dust-proof ring that is wound around the outer circumference of the garnish ring 11.

Reference numerals 13, 14, and 15 denote guide bars (guide members) that extend in the optical axis direction. The guide bars 13, 14, and 15 have front-end portions held by a holding portion 7b, which is provided on the inner circumference side of the movable barrel 7, and the like. The guide bars 13, 14, and 15 also have rear-end portions held by a metal plate 16 that is coupled to the rear-end portion of the movable barrel 7. The metal plate 16 is positioned with respect to the movable barrel 7 by positioning dowels 7c (see FIG. 6) that are provided at the rear-end portion of the movable barrel 7.

The first movable lens frame 9 has a sleeve portion 9a that engages with the guide bar 14 so as to be movable in the optical axis direction and a U-shaped groove portion 9b that engages with the guide bar 15 so as to be movable in the optical axis direction. The engagement between the sleeve portion 9a and the guide bar 14 guides the first movable lens frame 9 (the first movable lens 2) in the optical axis direction, and the engagement between the U-shaped groove portion 9b and the guide bar 15 prevents the first movable lens frame 9 from rotating about the guide bar 14.

Reference numeral 17 denotes a second movable lens frame that holds the second movable lens 3. A sleeve portion 17a provided at the second movable lens frame 17 engages with the guide bar 13 so as to be movable in the optical axis direction, and a U-shaped groove portion 17b engages with the guide bar 15 so as to be movable in the optical axis direction. The engagement between the sleeve portion 17a and the guide bar 13 guides the second movable lens frame 17 (the second movable lens 3) in the optical axis direction, and the engagement between the U-shaped groove portion 17b and the guide bar 15 prevents the second movable lens frame 17 from rotating about the guide bar 13.

Reference numeral 24 denotes a cylindrical cam that moves the first movable lens frame 9 and the second movable lens frame 17 in the optical axis direction inside the movable barrel 7 during image pickup. The cylindrical cam 24 has a front-end portion and a rear-end portion respectively rotatably held by a bearing portion 7a, which is provided in the movable barrel 7, and the metal plate 16. A first cam-groove portion 24a for driving the first movable lens 2 in the optical axis direction and a second cam-groove portion 24b for driving the second movable lens 3 in the optical axis direction are formed in the cylindrical cam 24. A taper pin (cam follower) 9c formed integrally with the first movable lens frame 9 engages with the first cam-groove portion 24a. A taper pin (cam follower) 17c formed integrally with the second movable lens frame 17 engages with the second cam-groove portion 24b.

As shown in FIG. 6, the sleeve portions 9a and 17a of the first and second movable lens frames 9 and 17 (guide bars 14 and 13) are arranged above the first and second movable lenses 2 and 3 inside the movable barrel 7. The sleeve portions 9a and 17a are arranged near the cylindrical cam 24 on both sides in the radial direction of the cylindrical cam 24. The taper pins 9c and 17c are respectively provided at the sleeve portions 9a and 17a, as shown in FIGS. 6, 1, and 2. This arrangement allows the cylindrical cam 24 to stably drive the first movable lens frame 9 and the second movable lens frame 17 in the optical axis direction and makes it possible to compactly, i.e., space-efficiently arrange these components inside the movable barrel 7.

Reference numeral 25 denotes a stepping motor as a second actuator. A pulley gear portion 25a is attached to an output shaft of the stepping motor 25. As shown in FIG. 7, a timing belt 31 is wound around between the pulley gear portion 25a and a gear portion 24c formed at the cylindrical cam 24. For this reason, when the stepping motor 25 rotates, a driving force from the stepping motor 25 is transmitted to the cylindrical cam 24 through the timing belt 31 to rotate the cylindrical cam 24. When the cylindrical cam 24 rotates, the first movable lens frame 9 and the second movable lens frame 17, whose taper pins 9c and 17c respectively engage with the first and second cam-groove portions 24a and 24b, are driven in the optical axis direction.

The stepping motor 25 is attached to a flange portion 7d provided at the movable barrel 7. Accordingly, the stepping motor 25, the cylindrical cam 24, and the timing belt 31 are moved in the optical axis direction integrally with the movable barrel 7. The stepping motor 25 is activated in response to a driving signal transmitted from the control circuit 60 through the flexible printed board (not shown).

Reference numeral 32a denotes a photointerrupter that has a light-emitting element and a light-receiving element (both not shown). The photointerrupter 32a switches between a light-transmitting state and a light-shielding state using a light-shielding wall 7e provided at the movable barrel 7, thereby turning on or off the output signal of the photointerrupter 32a. The control circuit 60 can detect the absolute positions of the first movable lens 2 and the second movable lens 3 by monitoring the output signal. The photointerrupter 32a is fixed to the second movable lens frame 17.

Reference numeral 22 denotes a stop unit that is attached to the second movable lens frame 17 and moves in the optical axis direction integrally with the second movable lens frame 17. Reference numeral 23 denotes a stop motor that drives the stop unit 22. The stop motor 23 is activated in response to a driving signal transmitted from the control circuit 60 through the flexible printed board described above.

The movable barrel 7, the first movable lens frame 9 (the first movable lens 2), the second movable lens frame 17 (the second movable lens 3), the guide bars 13 to 15, the stepping motor 25, the cylindrical cam 24, the stop unit 22, the stop motor 23, and the photointerrupter 32a constitute the movable barrel unit.

Reference numerals 19 and 20 denote guide bars that extend in the optical axis direction. The guide bars 19 and 20 have rear-end portions held by holding portions 1b and 1c provided at the image sensor holder 1 and front-end portions held by a metal plate 21 coupled to the front-end portion of the image sensor holder 1. The metal plate 21 is positioned with respect to the image sensor holder 1 by positioning dowels 1d provided at the front-end portion of the image sensor holder 1.

Reference numeral 18 denotes a third movable lens frame that holds the third movable lens 4. A sleeve portion 18a provided at the third movable lens frame 18 engages with the guide bar 19 so as to be movable in the optical axis direction, and a U-shaped groove portion 18b engages with the guide bar 20 so as to be movable in the optical axis direction. The engagement between the sleeve portion 18a and the guide bar 19 guides the third movable lens frame 18 (the third movable lens 4) in the optical axis direction, and the engagement between the U-shaped groove portion 18b and the guide bar 20 prevents the third movable lens frame 18 from rotating about the guide bar 19.

Reference numeral 26 denotes a rack that is attached to the third movable lens frame 18, and reference numeral 27 denotes a stepping motor for moving the third movable lens 4 in the optical axis direction. A lead screw portion 28 is formed at an output shaft of the stepping motor 27. The rack 26 meshes with the lead screw portion 28. For this reason, when the stepping motor 27 rotates, the meshing action between the lead screw portion 28 and the rack 26 drives the third movable lens frame 18 in the optical axis direction.

Reference numeral 29 denotes a motor holding plate that holds the stepping motor 27 and the lead screw portion 28. The motor holding plate 29 is fixed to the image sensor holder 1 in the optical axis direction at its motor fixing portion 29a. The stepping motor 27 is activated in response to a driving signal transmitted from the control circuit 60 through a flexible printed board (not shown). The control circuit 60 controls the stepping motor 27 while detecting the position of the third movable lens frame 18 using a photointerrupter 32b attached to the image sensor holder 1. The photointerrupter 32b switches between a light-transmitting state and a light-shielding state using a light-shielding wall 18c provided at the third movable lens frame 18, thereby turning on or off an output signal of the photointerrupter 32b. The control circuit 60 can detect the absolute position of the third movable lens 4 by monitoring the output signal.

The image sensor holder 1, the guide barrel 5, the cam ring 6, the third movable lens frame 18 (the third movable lens 4), the guide bars 19 and 20, the stepping motor 27, the stepping motor unit 30, and the photointerrupter 32b constitute a fixed barrel unit. The fixed barrel unit and the movable barrel unit described above constitute a retractable type lens barrel (lens apparatus).

The operation of the lens barrel with the above-described configuration will be described next.

When a driving signal is transmitted from the control circuit 60 to the stepping motor 30a to shift the lens barrel from the retracted state shown in FIG. 2 to the wide-angle state in FIG. 3, the stepping motor 30a is activated. Then, the output therefrom is transmitted to the large gear portion 6e of the cam ring 6 through the reduction gear mechanism 30b. The output rotates the cam ring 6 about the optical axis with respect to the guide barrel 5.

Since the movable barrel 7 is prevented from rotating about the optical axis by the engagement between the taper rollers 10 and the guide groove portions 5c of the guide barrel 5, the engaging action between the taper rollers 10 and the cam-groove portions 6b of the cam ring 6 drives the movable barrel 7 in the optical axis direction. As a result, the movable barrel 7 moves from the retracted position to the wide-angle position shown in FIG. 3, which protrudes forward from the guide barrel 5.

Figure 8:
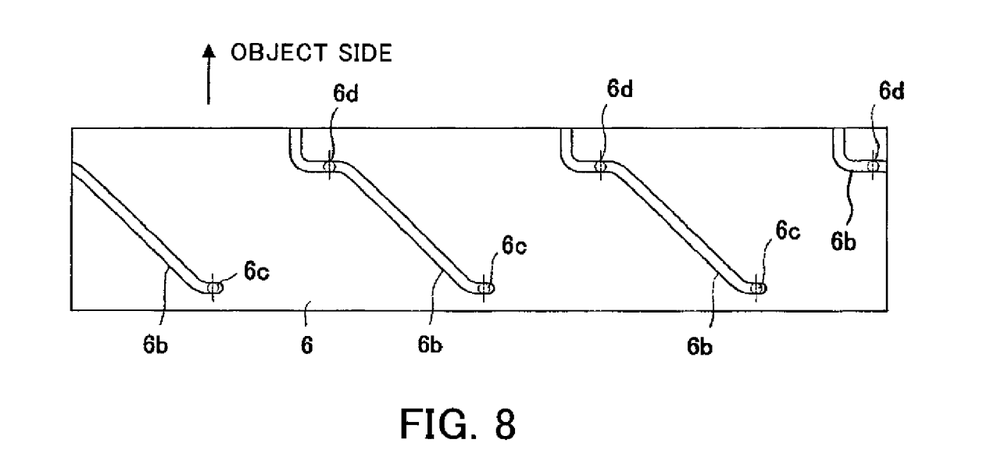
FIG. 8 is a developed view of a cam ring in the lens barrel of the embodiment.

FIG. 8 is a circumferentially developed view of the cam-groove portions 6b of the cam ring 6. The three cam-groove portions 6b are formed in the cam ring 6 at regular intervals in the circumferential direction (the horizontal direction in FIG. 8). The upper side of FIG. 8 is the object side.

In FIG. 8, positions of the taper rollers 10 denoted by reference numeral 6c correspond to the retracted state in FIG. 2, and positions of the taper rollers 10 denoted by reference numeral 6d correspond to the wide-angle state, the intermediate-focal-length state, and the telephoto state respectively shown in FIGS. 3, 4, and 5. In other words, the movable barrel 7 (movable barrel unit) is driven to advance and retreat in the optical axis direction by the cam-groove portions 6b in a retracted range between the retracted position and the wide-angle position, while it is not driven to advance and retreat, that is, it is kept stopped in an image-capturable range (zoom range) between the wide-angle position and the telephoto position.

Figure 9:
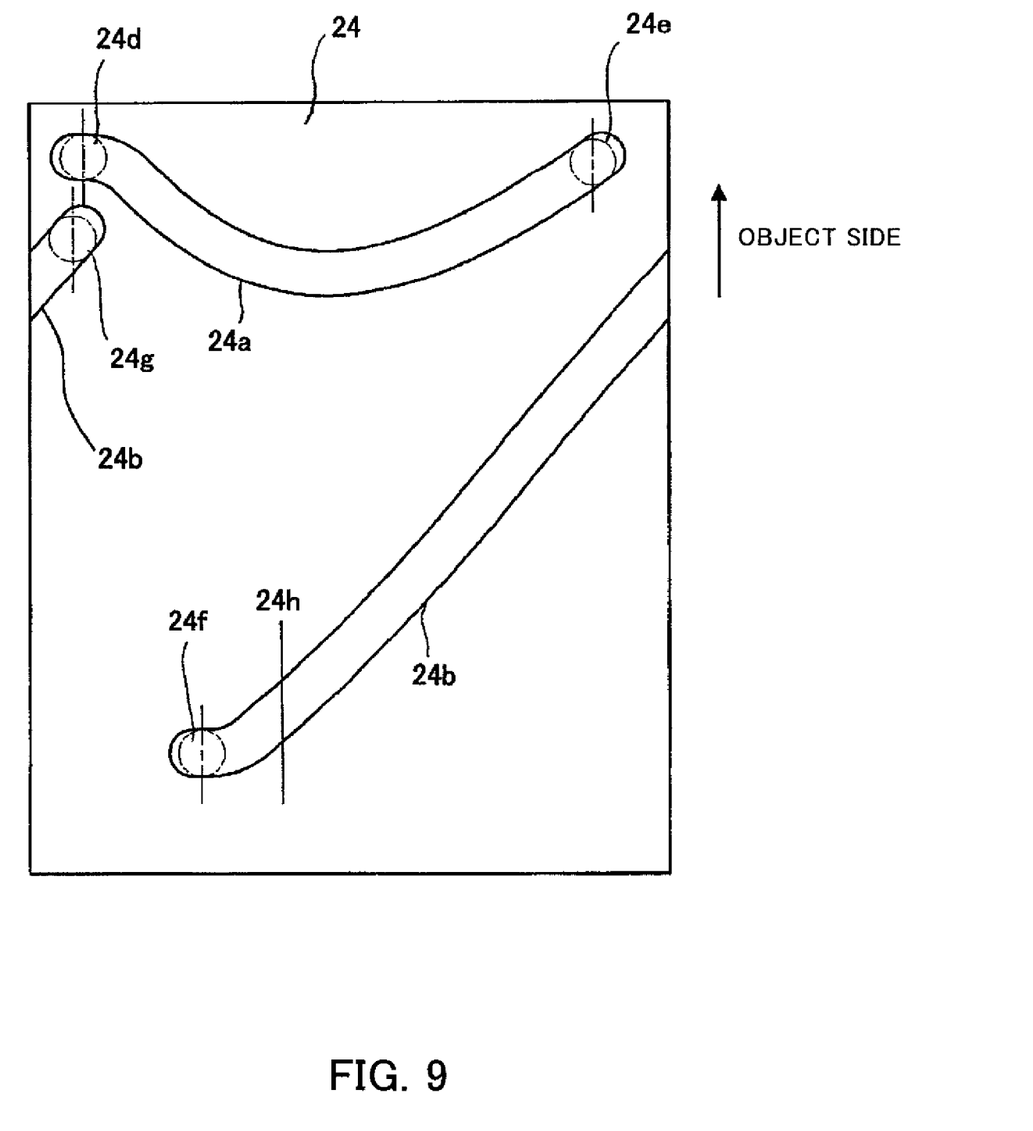
FIG. 9 is a developed view of a cylindrical cam in the lens barrel of the embodiment.

FIG. 9 is a circumferentially developed view of the first and second cam-groove portions 24a and 24b of the cylindrical cam 24. The first and second cam-groove portions 24a and 24b are formed separately in the optical axis direction (the vertical direction in FIG. 9). The upper side of FIG. 9 is the object side. In the retracted state shown in FIG. 2, the taper pin 9c provided at the first movable lens frame 9 engages with the first cam-groove portion 24a at a position denoted by reference numeral 24e in FIG. 9, and the taper pin 17c provided at the second movable lens frame 17 engages with the second cam-groove portion 24b at a position denoted by reference numeral 24g in FIG. 9.

Both of the positions 24e and 24g where the taper pins 9c and 17c engage with the first and second cam-groove portions 24a and 24b also serve as engaging positions thereof for the telephoto state shown in FIG. 5. When the taper pins 9c and 17c are located at the positions 24e and 24g, the first movable lens 2 and the second movable lens 3 are closest to each other on the front-end side of the movable barrel 7. Accordingly, the length of the lens barrel in the optical axis direction in the retracted state is minimized by employing these engaging positions also for the retracted state.

For this reason, when the lens barrel is shifted from the retracted state shown in FIG. 2 to the wide-angle state shown in FIG. 3, the stepping motor 30a is activated to move the movable barrel 7 to the object side, and the stepping motor 25 is also activated. The stepping motor 25 is driven until the photointerrupter 32a switches from the light-shielding state to the light-transmitting state. After the engaging position of the second cam-groove portion 24b and the taper pin 17c reaches a switchover detecting position 24h, the stepping motor 25 is further driven by a predetermined number of pulses. With this series of operations, the engaging positions move from the positions 24e and 24g for the retracted state (telephoto state) to positions 24d and 24f for the wide-angle state.

At this time, the engaging action between the first cam-groove portion 24a and the taper pin 9c drives the first movable lens frame 9 in the optical axis direction while the first movable lens frame 9 is guided by the guide bar 14 and prevented from rotating by the guide bar 15. Also, the engaging action between the second cam-groove portion 24b and the taper pin 17c drives the second movable lens frame 17 in the optical axis direction while the second movable lens frame 17 is guided by the guide bar 13 and prevented from rotating by the guide bar 15.

Simultaneously with this, the control circuit 60 also transmits a driving signal to activate the stepping motor 27, thereby moving the third movable lens frame 18 to a position for the wide-angle state shown in FIG. 3.

When the lens barrel is shifted from the wide-angle state to either one of the intermediate-focal-length state and the telephoto state respectively shown in FIGS. 4 and 5, the stepping motor 25 is activated to move the first and second movable lens frames 9 and 17 inside the movable barrel 7 while the stepping motor 30a is kept stopped (i.e., the cam ring 6 is kept stopped). At the same time, the stepping motor 27 is activated to move the third movable lens frame 18 to a position for the intermediate-focal-length state or the telephoto state.

In the lens barrel of this embodiment, in zooming between the wide-angle state and the telephoto state, the first and second movable lenses 2 and 3 are moved by the stepping motor 25 and the cylindrical cam 24 without drive of the cam ring 6 through the reduction gear mechanism 30b. This can achieve the same level of noise reduction as a video camera lens, compared to a case where first and second movable lenses are driven by transmitting a driving force from a stepping motor to a cam ring through a reduction gear mechanism. Additionally, elimination of rotation of the cam ring 6 can prevent generation of sound caused by sliding of the cam ring 6 on the guide barrel 5, thereby enabling further noise reduction.

In this embodiment, the two movable lenses 2 and 3 are driven inside the movable barrel 7 without using the cam ring 6. This can make the size of the cam ring 6 smaller than a case where two movables lenses are driven using a cam ring, thereby enabling miniaturization of the camera.

In this embodiment, the stepping motor 25 and the cylindrical cam 24 are provided inside the movable barrel 7 together with the movable lenses 2 and 3. This prevents formation of a noticeable protrusion at an outer surface of the lens barrel, thereby enabling reduction of noise due to zoom driving without increasing the size of the lens barrel.

Figure 10:
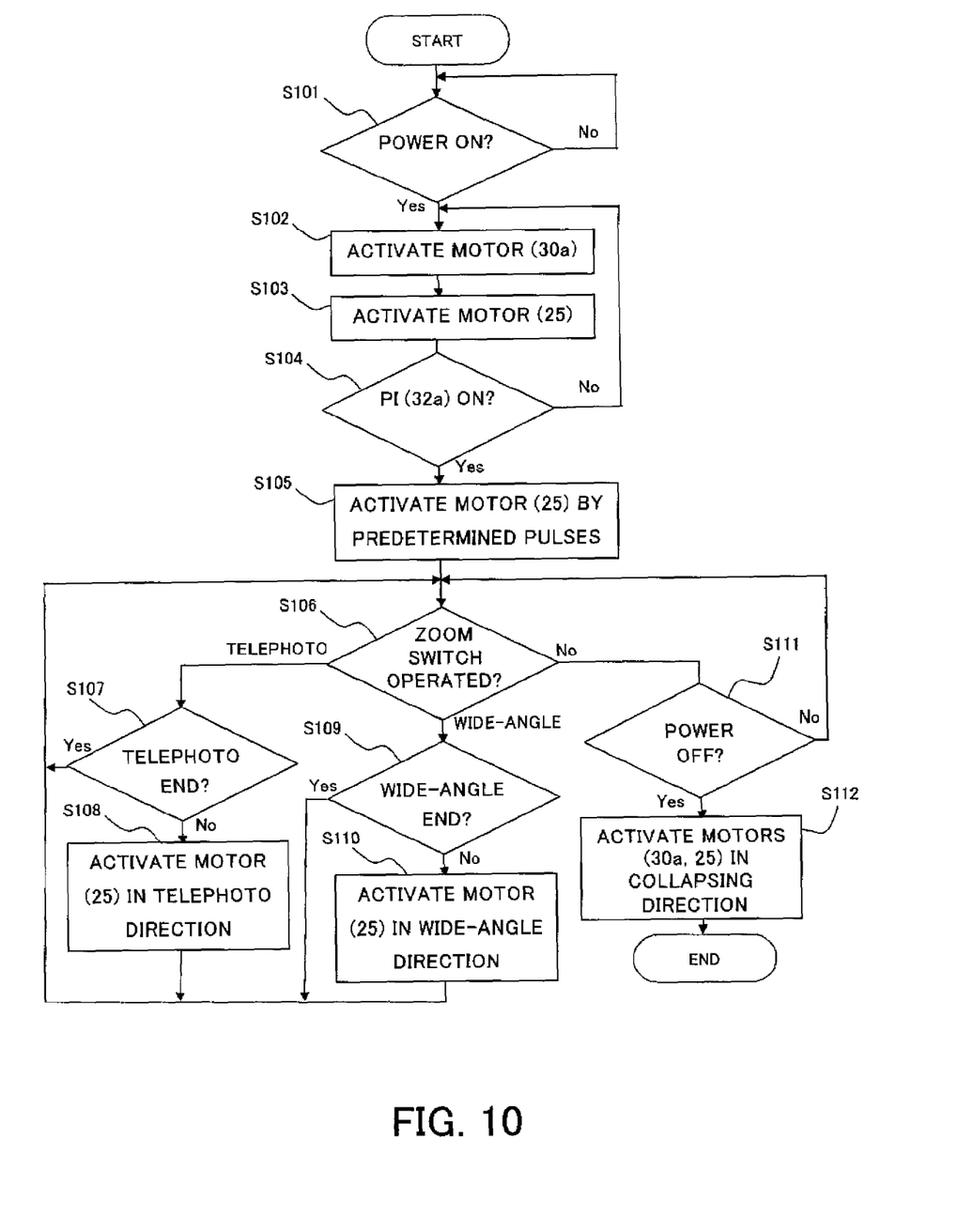
FIG. 10 is a flow chart showing control of the lens barrel in the camera of the embodiment.

FIG. 10 is a flow chart showing control of the operation of the lens barrel by the control circuit 60 of the camera in this embodiment. The control is executed in accordance with a computer program stored in the control circuit 60 as a microcomputer.

In step (abbreviated as S in FIG. 10) 101, the control circuit 60 determines whether or not a power switch (not shown) provided on the camera main body 50 is turned on. If the power switch is not turned on, the determination in step 101 is repeated. On the other hand, if the power switch is turned on, the flow advances to step 102.

In step 102, the control circuit 60 moves the movable barrel 7 to the wide-angle position by driving the stepping motor 30a to rotate the cam ring 6. Simultaneously with this, in step 103, the control circuit 60 activates the stepping motor 25 to rotate the cylindrical cam 24, thereby moving the first and second movable lenses 2 and 3 from positions for the retracted state toward positions for the wide-angle state.

In step 104, the control circuit 60 determines whether or not the photointerrupter 32a has switched from the light-shielding state (OFF) to the light-transmitting state (ON). If the photointerrupter 32a is switched to ON, the flow advances to step 105. In step 105, the control circuit 60 activates the stepping motor 25 by a predetermined number of pulses. With this operation, the first and second movable lenses 2 and 3 are moved to the positions for the wide-angle state, and thus the lens barrel is brought into the image-capturable state.

In step 106, the control circuit 60 determines whether or not a zoom switch (not shown) provided on the camera main body 50 is operated. If the zoom switch is operated to the telephoto side, the control circuit 60 determines in step 107 whether or not the zoom state is the telephoto state. If the zoom state is the telephoto state, the flow returns to step 106.

On the other hand, if the zoom state is not the telephoto state, the flow advances to step 108. In step 108, the control circuit 60 activates the stepping motor 25 by a predetermined number of pulses in a direction to move the first and second movable lenses 2 and 3 toward the positions for the telephoto state, and then the flow returns to step 106.

If the zoom switch is momentarily operated to the telephoto side, the first and second movable lenses 2 and 3 are moved toward the positions for the telephoto state by an amount corresponding to the predetermined number of pulses. If the zoom switch is continuously operated to the telephoto side, the processes in steps 106 to 108 are repeated, and thereby the first and second movable lenses 2 and 3 are continuously moved toward the positions for the telephoto state.

If the control circuit 60 determines in step 106 that the zoom switch is operated to the wide-angle side, the control circuit 60 determines in step 109 whether or not the zoom state is the wide-angle state. If the zoom state is the wide-angle state, the flow returns to step 106.

On the other hand, if the zoom state is not the wide-angle state, the flow advances to step 110. In step 110, the control circuit 60 activates the stepping motor 25 by a predetermined number of pulses in a direction to drive the first and second movable lenses 2 and 3 toward the positions for the wide-angle state, and then the flow returns to step 106.

If the zoom switch is momentarily operated to the wide-angle side, the first and second movable lenses 2 and 3 are moved toward the positions for the wide-angle state by an amount corresponding to the predetermined number of pulses. If the zoom switch is continuously operated to the wide-angle side, the processes in steps 106, 109, and 110 are repeated, and thereby the first and second movable lenses 2 and 3 are continuously moved toward the positions for the wide-angle state.

If the control circuit 60 determines in step 106 that the zoom switch is not operated, the control circuit 60 determines in step 111 whether or not the power switch is operated to be turned off. If the power switch is not operated to be turned off, the flow returns to step 106.

On the other hand, if the power switch is operated to be turned off, the flow advances to step 112. In step 112, the control circuit 60 activates both of the stepping motor 30a and the stepping motor 25 such that the movable barrel 7 and the first and second movable lenses 2 and 3 are moved toward the positions for the retracted state. When the lens barrel is retracted, the process ends.

Note that although this embodiment has described a lens barrel used in a digital still camera, embodiments of the present invention also include a lens barrel of any other image-pickup apparatus such as a video camera or a film camera.

Although this embodiment has described a case where an image-pickup apparatus has a one-step extensible type retractable lens barrel in which one movable barrel advances and retreats, embodiments of the present invention also include a case where an image-pickup apparatus has a multi-step extensible type retractable lens barrel in which two or more movable barrels advance and retreat relative to each other and the main body of the image-pickup apparatus.

This embodiment has described a case where the stepping motors and the cylindrical cam are housed inside the movable barrel together with the movable lenses. However, an actuator which drives the cylindrical cam is not limited to a stepping motor, and a DC motor or vibration type motor may be used instead thereof. Alternatively, a linear actuator such as a voice coil motor or vibration type linear actuator may be housed inside the movable barrel together with the movable lens instead of the cylindrical cam, and the movable lens may be moved in the optical axis direction directly by the linear actuator.

Furthermore, the present invention is not limited to these embodiments and various variations and modifications may be made without departing from the scope of the present invention.

This application claims priority to Japanese Patent Application No. 2006-236438, filed on Aug. 31, 2006, which is hereby incorporated by reference herein in its entirety as if fully set forth herein.

What is claimed is:

1. An optical apparatus comprising:
   a main body;
   a lens movable in a direction of an optical axis;
   a movable housing member housing the lens and movable in the direction of the optical axis between a first position where the movable housing member is retracted in the main body and a second position where the movable housing member protrudes from the first position;
   a first actuator configured to move the movable housing member between the first position and the second position;
   a second actuator configured to move the lens with respect to the movable housing member; and
   a cam ring member rotatably driven about the optical axis by the first actuator so as to move the movable housing member in the optical axis direction.

2. The optical apparatus according to claim 1, wherein the cam ring member is kept stopped while the lens is moved by operation of the second actuator.

3. An optical apparatus comprising:
   a main body;
   a lens movable in a direction of an optical axis;
   a movable housing member housing the lens and movable in the direction of the optical axis between a first position where the movable housing member is retracted in the main body and a second position where the movable housing member protrudes from the first position;
   a first actuator configured to move the movable housing member between the first position and the second position;
   a second actuator configured to move the lens with respect to the movable housing member; and
   a controller controlling the first and second actuators,
   wherein the controller keeps the first actuator stopped when controlling the second actuator to move the lens with respect to the movable housing member.

4. An optical apparatus comprising:
   a main body;
   a lens movable in a direction of an optical axis;
   a movable housing member housing the lens and movable in the direction of the optical axis between a first position where the movable housing member is retracted in the main body and a second position where the movable housing member protrudes from the first position;
   a first actuator configured to move the movable housing member between the first position and the second position;
   a second actuator configured to move the lens with respect to the movable housing member; and
   a controller controlling the first and second actuators,
   wherein the controller controls the second actuator to move the lens with respect to the movable housing member when controlling the first actuator to move the movable housing member between the first position and the second position.

* * * * *